(12) United States Patent
Um et al.

(10) Patent No.: US 8,326,336 B2
(45) Date of Patent: Dec. 4, 2012

(54) APPARATUS AND METHOD FOR COMMUNICATION IN COGNITIVE RADIO NETWORK

(75) Inventors: Jung-Sun Um, Daejeon (KR);
Myung-Sun Song, Daejeon (KR);
Chang-Joo Kim, Daejeon (KR);
Gwangzeen Ko, Daejeon (KR);
Sung-Hyun Hwang, Daejeon (KR);
Sang-Won Kim, Daejeon (KR);
Changhyun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 134 days.

(21) Appl. No.: 12/858,841

(22) Filed: Aug. 18, 2010

(65) Prior Publication Data

US 2011/0045862 A1    Feb. 24, 2011

(30) Foreign Application Priority Data

Aug. 18, 2009 (KR) .................. 10-2009-0076143
Aug. 16, 2010 (KR) .................. 10-2010-0078817

(51) Int. Cl.
*H04B 17/00* (2006.01)
*H04B 7/00* (2006.01)
*H04B 5/00* (2006.01)

(52) U.S. Cl. ... 455/513; 455/41.1; 455/41.2; 455/67.13; 455/226.1

(58) Field of Classification Search .................. 455/450, 455/41.1, 67.11, 62, 226.1, 41.2
See application file for complete search history.

(56) References Cited

U.S. PATENT DOCUMENTS

| 8,140,085 | B2 * | 3/2012 | Chaudhri et al. | 455/450 |
| 2006/0067354 | A1 * | 3/2006 | Waltho et al. | 370/433 |
| 2006/0171305 | A1 * | 8/2006 | Stefani et al. | 370/228 |
| 2006/0171445 | A1 * | 8/2006 | Batra et al. | 375/130 |
| 2007/0202867 | A1 * | 8/2007 | Waltho et al. | 455/423 |
| 2007/0287465 | A1 * | 12/2007 | Hyon et al. | 455/450 |
| 2008/0165754 | A1 * | 7/2008 | Hu | 370/342 |
| 2009/0011788 | A1 * | 1/2009 | Shan et al. | 455/522 |
| 2009/0117914 | A1 * | 5/2009 | Kwon et al. | 455/454 |
| 2009/0147741 | A1 | 6/2009 | Hu | |
| 2009/0170545 | A1 * | 7/2009 | Choi et al. | 455/513 |

FOREIGN PATENT DOCUMENTS

WO    2007/096819  A2    8/2007

* cited by examiner

*Primary Examiner* — Tilahun B Gesesse
(74) *Attorney, Agent, or Firm* — Nelson Mullins Riley & Scarborough LLP; EuiHoon Lee, Esq.

(57) ABSTRACT

A CR apparatus for performing communication in a CR network includes: a communication unit configured to measure a channel estimation signal, transmit measured channel state information to a master device, and, when a QP of a reference channel arrives, make a communication channel transition to a candidate channel and perform communication; and a channel information management unit configured to receive and manage the channel state information measured by the communication unit and channel information comprising a candidate channel, into which a channel transition is to be made during a QP of the reference channel, received from the master device and control channel transition of the communication unit based on the channel information.

20 Claims, 6 Drawing Sheets

APPARATUS AND METHOD FOR COMMUNICATION IN COGNITIVE RADIO NETWORK

CROSS-REFERENCES TO RELATED APPLICATIONS

The present application claims priority of Korean Patent Application Nos. 10-2009-0076143 and 10-2010-0078817, filed on Aug. 18, 2009, and Aug. 16, 2010, respectively, which are incorporated herein by reference in their entirety.

BACKGROUND OF THE INVENTION

1. Field of the Invention

Exemplary embodiments of the present invention relate to a cognitive radio system; and, more particularly, to a cognitive radio device and a master device configured for data communication and a method for data communication by the devices.

2. Description of Related Art

Various communication technologies coexist in current wireless communication systems. As a result, almost all frequency bands are allocated in wireless communication systems. Among the next-generation wireless communication systems, a Cognitive Radio (CR) system has been proposed in which, among allocated frequency bands, an empty frequency band (i.e. not in actual use) is detected, shared, and used.

In the CR system, there exists a Quiet Period (QP) on channels so that CR devices do not interfere with Incumbent User (IU) devices. The QP is used by IU devices to periodically check whether the current channel is used or not. The QP is necessary for protection of IU devices.

During the QP, CR devices suspend data transmission for the purpose of detecting whether IU devices are using channels or not, and detect whether IU devices are using channels. Therefore, the QP, though indispensable to the CR system, has a problem in that it degrades data transmission performance. Consequently, candidate channel management becomes very crucial to CR devices.

SUMMARY OF THE INVENTION

An embodiment of the present invention is directed to an apparatus and a method for managing channel information in a CR system.

Another embodiment of the present invention is directed to an apparatus and a method for managing channel information in a CR system so as to improve data transmission performance.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a CR apparatus for performing communication in a CR network includes: a communication unit configured to measure a channel estimation signal, transmit measured channel state information to a master device, and, when a QP of a reference channel arrives, make a communication channel transition to a candidate channel and perform communication; and a channel information management unit configured to receive and manage the channel state information measured by the communication unit and channel information comprising a candidate channel, into which a channel transition is to be made during a QP of the reference channel, received from the master device and control channel transition of the communication unit based on the channel information.

In accordance with another embodiment of the present invention, a master apparatus for performing communication in a CR network includes: a channel signal estimation unit configured to generate a channel estimation signal for estimation of a channel in the CR network; a communication unit configured to transmit the signal generated by the channel signal estimation unit and perform communication through a reference channel and a candidate channel; a channel information management unit configured to manage channel information regarding the reference channel and candidate channels, into which a channel transition is to be made in a QP of the reference channel, based on channel state information received from CR devices; and a channel allocation unit configured to allocate the reference channel or at least one of the candidate channels based on the channel information and control the communication unit.

In accordance with another embodiment of the present invention, a method for communication by a CR device of a CR network includes: making a channel transition from a reference channel to a candidate channel, when a starting point of a QP of the reference channel arrives during communication through the reference channel, in the QP; measuring a channel estimation signal in the candidate channel and reporting measured channel state information to a master device; and receiving channel information comprising a candidate channel, into which a channel transition is to be made in a QP of the reference channel, through the candidate channel into which a transition has been made.

In accordance with another embodiment of the present invention, a method for communication by a master device of a CR network includes: allocating a reference channel and a candidate channel to a CR device based on channel information; making a transition to the predetermined candidate channel based on the channel information when a starting point of a QP arrives in the reference channel; generating a channel estimation signal in the candidate channel and transmitting the channel estimation signal; and receiving channel state information from the CR devices, generating channel information regarding the reference channel and candidate channels, into which a channel transition is to be made in a QP of the reference channel, based on the channel state information, and transmitting the channel information.

DESCRIPTION OF SPECIFIC EMBODIMENTS

Figure 1:
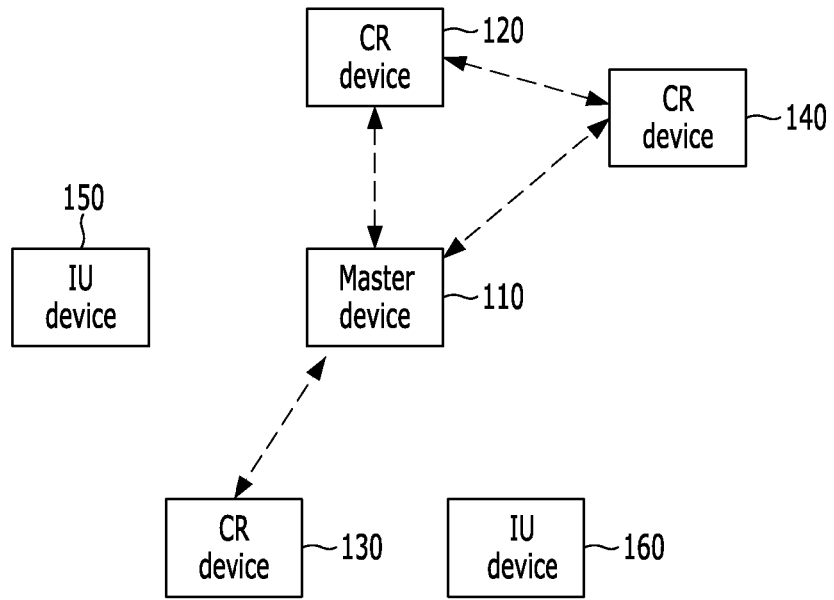
FIG. 1 illustrates a CR system in accordance with an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention will now be described with regard to an apparatus and a method for communication in a CR system, which can efficiently manage candidate channels and thus reduce degradation of data transmission performance.

FIG. 1 illustrates a CR system in accordance with an embodiment of the present invention.

Referring to FIG. 1, the CR system includes a master device 110, CR devices 120, 130, and 140, and IU devices 150 and 160.

The master device 110 is configured to manage channel information for allocating channels to the CR devices 120, 130, and 140. To this end, the master device 110 can acquire allocatable frequency bands, e.g. channel information, through communication with the CR devices 120, 130, and 140. Based on the acquired channel information, the master device 110 can allocate channels, which are not used by the IU devices 150 and 160, to the CR devices 120, 130, and 140, respectively. The master device 120 can acquire channel information by detecting whether channels are used by IU devices belonging to other networks or not. The master device 110 can share the channel information with another master device (not shown).

The master device 110 may be a base station, a CR device, a server device (not shown), etc. The master device 110 can detect whether the IU devices 150 and 160 are using channels and manage a data transmission channel and candidate channels.

The IU devices 150 and 160 may be user terminals, base stations, repeaters, base station controllers, etc.

The CR devices 120, 130, and 140 are configured to have communication channels allocated by the master device 110 and perform communication through the allocated channels, which are not used by the IU devices 150 and 160.

In accordance with the present invention, the master device 110 can allocate a candidate channel (or backup channel), which is to be used during a QP, to each of the CR devices 120, 130, and 140. The QP refers to a period for respective CR devices 120, 130, and 140 to periodically check whether the current channel is used by the IU devices 150 and 160. The QP is used to protect the IU devices 150 and 160. The master device 110 may allocate a plurality of candidate channels to a single CR device.

It will be assumed, for example, that a QP has occurred in the CR device 120.

The CR device 120 performs data communication through a reference channel allocated by the master device 110. When a QP occurs in the reference channel, the CR device 120 makes a channel transition into a candidate channel, which has been allocated by the master device 110.

The CR device 120 then can communicate through the candidate channel.

As described above, in accordance with the present invention, when a QP occurs in the CR device 120, a transition is made to a candidate channel, which is then used to transmit data. Therefore, by performing communication through the candidate channel during the QP of the reference channel, the CR device 120 can prevent degradation of data transmission performance even during the QP of the reference channel.

The CR device 120 can either exchange normal data through the candidate channel or receive channel information for managing the corresponding candidate channel. By receiving channel information through the candidate channel, the CR device 120 can secure a list of candidate channels based on the received channel information. In addition, the CR device 120 can estimate the channel state through a signal or a message, which enables channel information estimation, and transmit the channel state to the master device 110 so that the master device 110 can manage candidate channels. The CR device can also transmit channel information to other CR devices.

Figure 2:
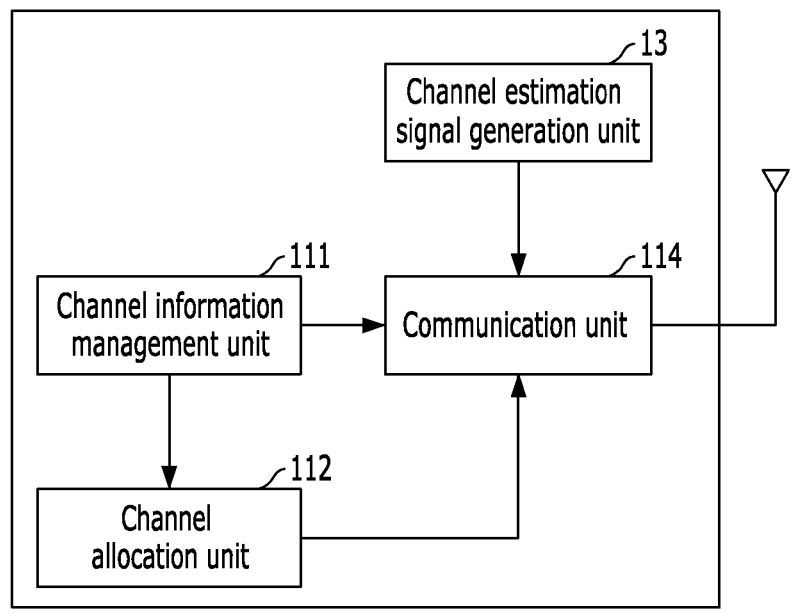
FIG. 2 illustrates a master device shown in FIG. 1.

FIG. 2 illustrates a master device shown in FIG. 1.

Referring to FIG. 2, the master device 110 includes a channel information management unit 111, a channel allocation unit 112, a channel estimation signal generation unit 113, and a communication unit 114.

The channel information management unit 111 is configured to collect channel information through the communication unit 114 and manage channel information regarding each of a plurality of channels using the collected channel information. The channel information management unit 111 can update changed channel information.

The channel allocation unit 112 is configured to allocate a reference channel for data communication or a candidate channel to each of the CR devices 120, 130, and 140 based on channel information of the channel information management unit 111. The channel allocation unit 112 may allocate at least one candidate channel when allocating channels to at least one of the CR devices 120, 130, and 140.

The channel allocation unit 112, for the purpose of candidate channel allocation, can select a channel in which IU devices 150 and 160 appear the most infrequently, and which has the least interference with the IU devices 150 and 160 operating through an adjacent channel. During candidate channel allocation, the channel allocation unit 112 can determine the priority of candidate channel use among the CR devices 120, 130, and 140. The channel allocation unit 112 can also allocate a plurality of channels to each of the CR devices 120, 130, and 140.

When there is an optimum reference channel or candidate channel to be allocated to a CR device based on channel information, the channel allocation unit 112 can allocate the corresponding reference channel or the corresponding candidate channel to the CR device. The channel allocation unit 112 can transmit channel information regarding the allocated reference channel or candidate channel to corresponding CR devices. The channel allocation unit 112 can also provide a CR device, which has made a channel transition to a candidate channel during a QP, with channel information regarding the corresponding candidate channel.

The channel information, for example, includes at least one of channel estimation information, channel group management information, network information, and broadcasting information.

The channel estimation information refers to information for estimating the channel state. The channel estimation information may include at least one of synchronization information for synchronization with adjacent CR devices, channel estimation information for removing channel influence of SINR estimation information, and SINR estimation information for SINR measurement.

The channel group management information refers to information for managing a channel group. The channel group information includes at least one of channel group list information including information regarding all or some channels (e.g. channel ID), channel management parameter information including parameters for channel use, and channel state feedback information for channel state feedback. The channel state feedback information includes channel estimation results. An example of transmission of the channel state feedback information will now be described briefly.

The channel state is measured in the $(t-1)^{th}$ QP, and the measured channel state is transmitted to manage the next QP, i.e. $t^{th}$ QP. That is, by transmitting the channel state measured in the previous QP, the channel state feedback information becomes information for managing the channel up to the very next QP.

Alternatively, feedback information may be transmitted as normal data even in a normal data transmission period other than a QP, i.e. during data communication through a reference channel.

The network information refers to information for providing information for network management, control, etc. The network information includes at least one of network management information for network management, network control information for network control, and network sharing data information for providing information shared between adjacent networks.

The broadcasting information refers to information for providing information periodically broadcasted from the master device to the CR devices.

The communication unit 114 is configured to receive state information regarding respective channels from devices around the master device 110 and provide the channel information management unit with the received state information. The communication unit 114 is configured to transmit channel information regarding a reference channel or a candidate channel, which has been allocated by the channel allocation unit 111, to corresponding CR devices. When transmitting channel information regarding a candidate channel, the communication unit 114 may provide a CR device, which has made a channel transition to a candidate channel during a QP, with channel information through the corresponding candidate channel.

Figure 3:
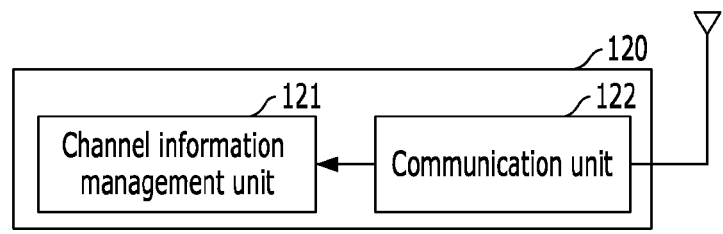
FIG. 3 illustrates a CR device shown in FIG. 1.

FIG. 3 illustrates a CR device shown in FIG. 1.

Referring to FIG. 3, the CR device 120 includes a channel information management unit 121 and a communication unit 122.

The channel information management unit 121 can manage channel information received through the communication unit 122. The channel information management unit 121 is configured to manage information regarding a reference channel or a candidate channel. The channel information management unit 121 is configured to update channel information as the channel information received from the master device 110 changes.

When the channel information management unit 121 receives channel information, specifically channel estimation information, it can measure the channel state, e.g. SINR, link margin, and channel response characteristics (e.g. RMS relay) using the channel estimation information.

The channel information management unit 121 can determine communication parameters of the corresponding candidate channel, e.g. initial transmission power, modulation order, channel code, code rate, etc., based on the measured channel state. The channel information management unit 121 can also use the SINR to select an optimum candidate channel, into which a transition is to be made during a QP, and to select priority between candidate channels.

The channel information management unit 121 can receive channel information, e.g. channel estimation information, channel group management information, network information, and broadcasting information, from the master device 110 or measure channel information and manage it. If necessary, the master device 110 may be provided with the channel information, which is managed by the channel information management unit 121 after being received from the master device 110 or measured by the channel information management unit 121, through the communication unit 122. That is, the channel information management unit 121 can manage information regarding candidate and reference channels, which is necessary for channel transition.

The channel information management unit 121 can perform sensing regarding a candidate channel before using the candidate channel. When it is confirmed as a result of sensing that the candidate channel is used by another CR device or IU device, the channel information management unit 121 does not use the corresponding candidate channel. In addition, the channel information management unit 121 reports the fact that the candidate channel is used by an IU device to the master device 110 and receives updated candidate channel information from the master device 110.

The communication unit 122 is configured to receive channel information from the master device 110 and provide the channel information management unit 121 with the received channel information. The communication unit 122 can exchange normal (streaming) data, i.e. perform data communication, through a reference channel. When a QP predetermined with regard to the reference channel arrives, the communication unit 122 can make a transition to one of candidate channels, which have been previously selected by the candidate channel management unit 121 from the master device 110, and perform data communication.

The communication unit 122 can receive channel information through a candidate channel and provide the channel information management unit 121 with the received channel information.

The communication unit 122 can utilize a communication parameter, which has been determined according to channel information managed by the candidate channel information management unit 121, for communication through the corresponding candidate channel.

The communication unit 122 can also transmit a channel estimation result to the master device 110, as well as to other CR devices. More specifically, the communication unit 122 of a CR device can transmit a channel estimation result to the master device 110. In the case of communication with another CR device, the communication unit 122 can transmit a channel estimation result to the CR device with which it is communicating.

Figure 4:
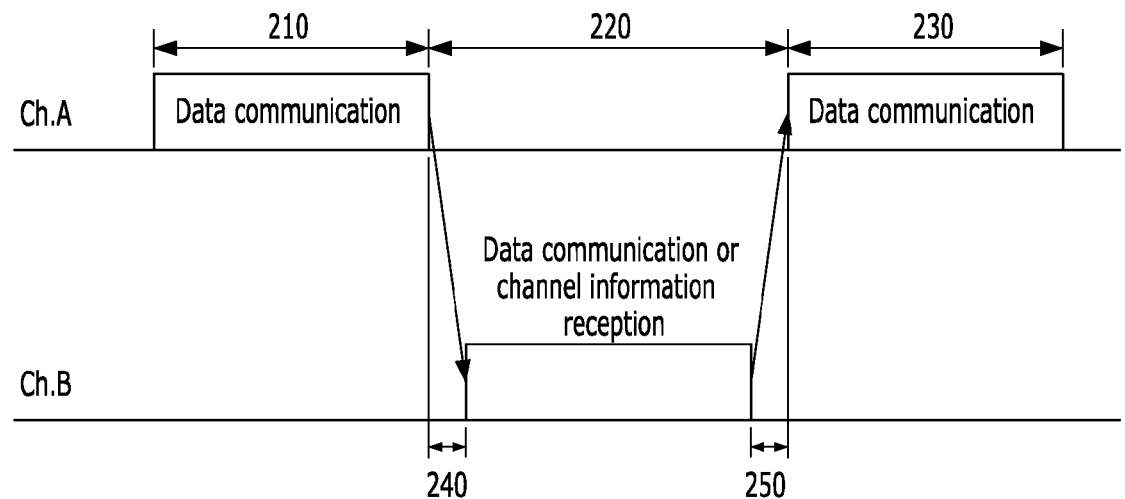
FIG. 4 illustrates a data transmission operation during a QP by a CR device in accordance with an embodiment of the present invention.

FIG. 4 illustrates a data communication operation by a CR device shown in FIG. 3.

Referring to FIG. 4, the CR device 120 communicates through channel A, e.g. reference channel. Channel A includes data communication periods 210 and 230 and a QP 220.

The CR device 120 performs data communication in the first data communication period 210 of channel A.

The CR device 120 then makes a transition to channel B, e.g. candidate channel, at the starting point of the QP 220 of channel A. The starting point of the QP is already known to both the master device and the CR devices. The target of channel transition, i.e. channel B in FIG. 4, is also already known to both the master device 110 and the CR device 120. The master device 120 (e.g. base station equipment) notifies all other CR devices of the channel transition target channel in advance. Furthermore, CR devices supposed to communicate with other CRs after the channel transition, as well as the communication order, are also predetermined. For example, the reception order of CR devices and the transmission order of CR devices are determined.

The CR device 120 also senses (e.g. inband sensing) whether channel A is used by an IU device in the QP of channel A.

The CR device 120 can perform data communication or receive channel information through channel B in the QP 220 of channel A. Specifically, the CR device 120 can transmit/receive normal (streaming) data or channel information through channel B (candidate channel).

The data or channel information transmitted through the candidate channel during the QP 220 between the CR device 120 and the master device 110 may be transmitted using minimum transmission power through data spreading and repeated transmission, for example, respectively. During the QP 220, furthermore, the CR device 120 may minimize candidate channel occupation time. Alternatively, the CR device 120 may select and use different candidate channels during a plurality of QPs, respectively.

The CR 120, when the QP 220 of channel A is over, makes another transition from channel B to channel A.

The CR device 120 requires a first transition time 240 for channel transition from channel A to channel B, as well as a second transition time 250 for channel transition from channel B to channel A. Therefore, the CR device used as a master device must consider the transition times 240 and 250 when selecting a candidate channel for the QP.

Those skilled in the art can understand that, although the present invention has been described with reference to FIG. 4 based on an assumption that the CR device of the CR system occupies one channel, the CR device can also occupy and use at least two channels.

The type of signals that can be transmitted through the candidate channel will now be described.

Firstly, information related to channel group management can be transmitted/received. For example, the transmitted/received information includes a channel group list, channel management parameters, channel state feedback information, etc. Secondly, the master device 110 can transmit information regarding network management and control to respective CR devices and receive response signals from respective CR devices. Thirdly, a normal data service, e.g. streaming service, can be transmitted/received. Fourthly, data information to be shared with an adjacent network can be exchanged between master devices, between CR devices, or between a CR device in an adjacent network and a master device. Fifthly, a specific signal for informing of the channel state, SINR, etc. of the current candidate channel, e.g. a training symbol and/or a preamble signal, can be transmitted.

Besides the above-mentioned signals, any necessary transmission can be performed through the candidate channel. As such, information to be periodically broadcasted by the master device 110 to other CR devices, etc. can be transmitted after a channel transition into a candidate channel. This improves resource utilization efficiency.

Figure 5:
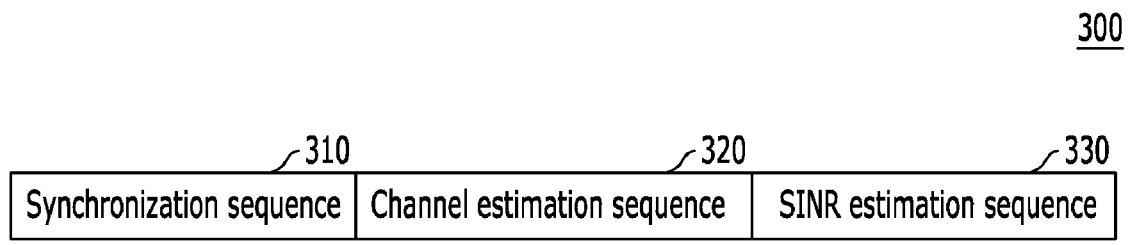
FIG. 5 illustrates channel information transmitted through a candidate channel in accordance with an embodiment of the present invention.

FIG. 5 illustrates channel estimation information transmitted through a candidate channel in accordance with an embodiment of the present invention.

Referring to FIG. 5, the channel estimation information 300 includes at least one of a synchronization sequence 310, a channel estimation sequence 320, and a SINR estimation sequence 330. The channel estimation information 300 corresponds to a type of channel information.

The synchronization sequence 310 refers to a sequence for synchronization between signals.

The channel estimation sequence 320 refers to a sequence for compensating for the SINR estimation sequence 330. Information included in the channel estimation sequence 310 minimizes the influence of on-channel noise and the like on the SINR estimation sequence.

The SINR estimation sequence 330 can be compensated for by the channel estimation sequence. The SINR estimation sequence may include information for determining the SINR, e.g. a training signal, a preamble, a pilot signal, etc.

The channel estimation information 300 may include at least one of a data ID, a device ID, a network ID (or network address). At least one of the data ID, the device ID, and the network ID can be mapped onto each sequence, e.g. the synchronization sequence 310, the channel estimation sequence 320, and the SINR estimation sequence 330. These types of ID information can be used to identify a candidate band commonly used between CR networks located in adjacent areas.

The above-mentioned sequences included in the channel estimation information 300 are only examples, and the channel estimation information 300 may include part of various sequences including the synchronization sequence 310, the channel estimation sequence 320, and the SINR estimation sequence 330.

The channel estimation information 300 described with reference to FIG. 5 can be received by a CR device from a master device through a candidate channel, as described above.

Figure 6:
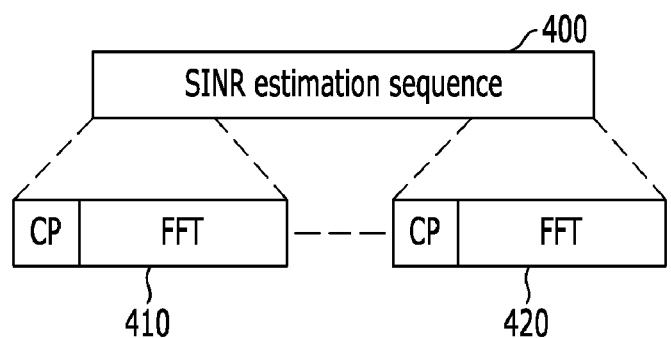
FIG. 6 illustrates SINR estimation information transmitted through a candidate channel in accordance with an embodiment of the present invention.

FIG. 6 illustrates channel estimation information transmitted through a candidate channel in accordance with another embodiment of the present invention.

FIG. 6 illustrates a structure of transmitting the SINR only, unlike the embodiment described with reference to FIG. 5. Synchronization and channel estimation are still possible using this structure.

Referring to FIG. 6, the SINR estimation sequence 400 includes a plurality of Orthogonal Frequency Division Multiplexing (OFDM) symbols 410 and 420. Therefore, it is assumed that the CR device receiving the SINR estimation sequence 400 supports the OFDM communication scheme, for example.

The SINR estimation sequence 400 can be transmitted so that the phase is continuous between the OFDM symbols 410 and 420.

The first OFDM symbol 410 includes a Cyclic Prefix (CP) and information that has undergone Fast Fourier Transform (FFT). The second OFDM symbol 420 includes a CP and information that has undergone FFT.

The OFDM symbols 410 and 420 may include the same information.

After receiving the OFDM symbols 410 and 420, a CR device can perform FFT, for example, compare resulting signals on constellation points with a reference signal, and measure the SINR.

Through the candidate channel, the SINR estimation sequence described with reference to FIG. 6 can be received by the CR device from the master device.

Assuming that the master device has already determined the power for transmitting information for SINR estimation illustrated in FIGS. 5 and 6, the CR device can predict loss on the channel.

A CR device in accordance with the present invention is configured to manage candidate channel information, and CR devices preferentially consider the channel state of candidate channels when selecting a candidate channel to be used for a QP. The CR device must check the channel state of each candidate channel during candidate channel selection. However, if there is no transmitted signal, the CR device cannot receive noise and interference signals to accurately measure the channel state.

The channel state is measured, for example, using the SINR. If there is no signal, i.e. transmitted signal, the channel state cannot be measured accurately.

To this end, the master device in accordance with the present invention provides channel estimation information, as illustrated in FIG. 5 or 6, through a candidate channel so that the CR device can measure the SINR.

In accordance with the present invention, the CR device can measure the state of a candidate channel from a channel estimation signal transmitted from the candidate channel during a QP, so that the channel state of a plurality of candidate channels can be managed.

Figure 7:
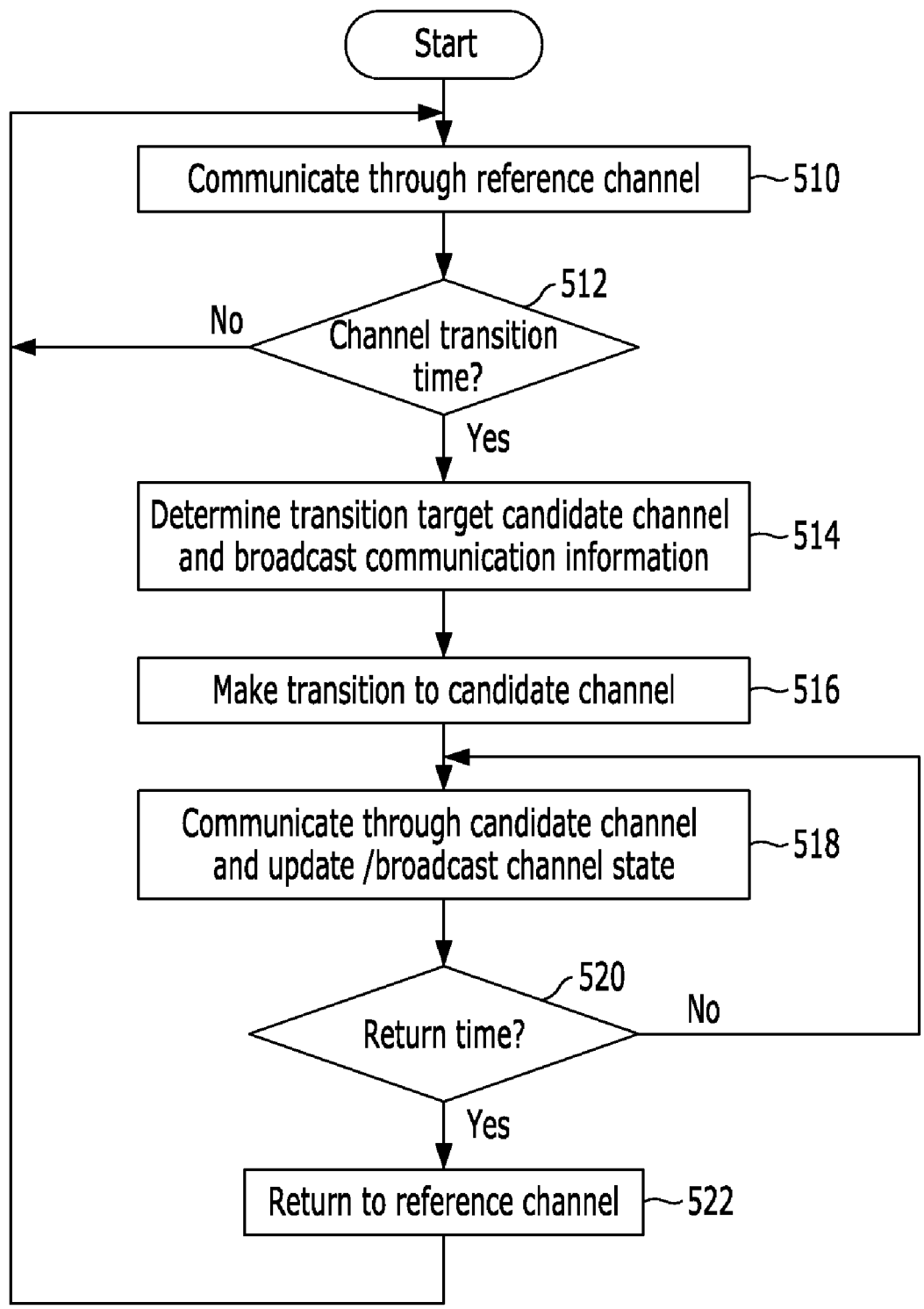
FIG. 7 is a flowchart illustrating the operation of a master device shown in FIG. 1.

FIG. 7 is a flowchart illustrating the operation of the master device shown in FIG. 1. Any situation in which new appearance of an IU device requires a channel transition is excluded in connection with the following description with reference to FIG. 7.

Referring to FIG. 7, the master device 110 performs communication through a reference channel at step S510. Basically, the communication may be data communication or exchange of channel state information between the master device 110 and a CR device or between CR devices. If necessary, the communication may be performed between a CR device in another network and the master device, between a master device in another network and the master device, or between a CR device in another network and a CR device in the network of the master device 110.

The master device 110 determines a candidate channel, into which a channel transition is to be made in a QP of the reference channel, and transmits information regarding communication through the transition target channel at step S512. The information regarding communication may be the above-mentioned transmission/reception order, for example.

It is to be noted that the order of steps S510 and S512 shown in FIG. 7 may be reversed. That is, the step S510 may come after the step S512. It is also possible to perform step S510, perform step S512 at a specific time, and resume the step S510. As such, those skilled in the art can understand that the steps S510 and S512 of FIG. 7 describe communication through the reference channel, but do not follow the time order.

The master device 110 checks if a predetermined channel transition time has arrived at step S514. Specifically, the mater device 110 monitors the arrival of time to make a channel transition from the reference channel to a candidate channel, as described above, which corresponds to the starting point of a QP of the reference channel.

When it is confirmed at the step S514 that the channel transition time has arrived, the master device 110 proceeds to step S516 and, if not, continuously performs the step S510 and/or S512.

After proceeding from the step S514 to the step S516, the master device 110 performs a channel transition to a predetermined candidate channel. Specifically, the master device 110 controls the communication unit 114 so as to make a transition to a candidate channel, which is stored in the channel information management unit 111 as a transition target. Such a channel transition to a candidate channel has already been described in detail, and further description thereof will be omitted herein.

After the channel transition, the master device 110 performs communication through the candidate channel, updates the channel state, and broadcasts the update result to CR devices in the network of the master device 110. The type of data that can be transmitted through the candidate channel during communication has already been described in detail, and further description thereof will be omitted herein.

The master device 110 checks if a return time has arrived at step S520. The return time is based on information, which concerns the predetermined time of use of the candidate channel after a transition from the reference channel to the candidate channel, and which is transmitted to each CR device during reference channel communication. When it is confirmed at the step S520 that the return time has arrived, the master device 110 proceeds to step S522 and returns to the reference channel and, if not, continues the communication through the candidate channel at the step S518.

Figure 8:
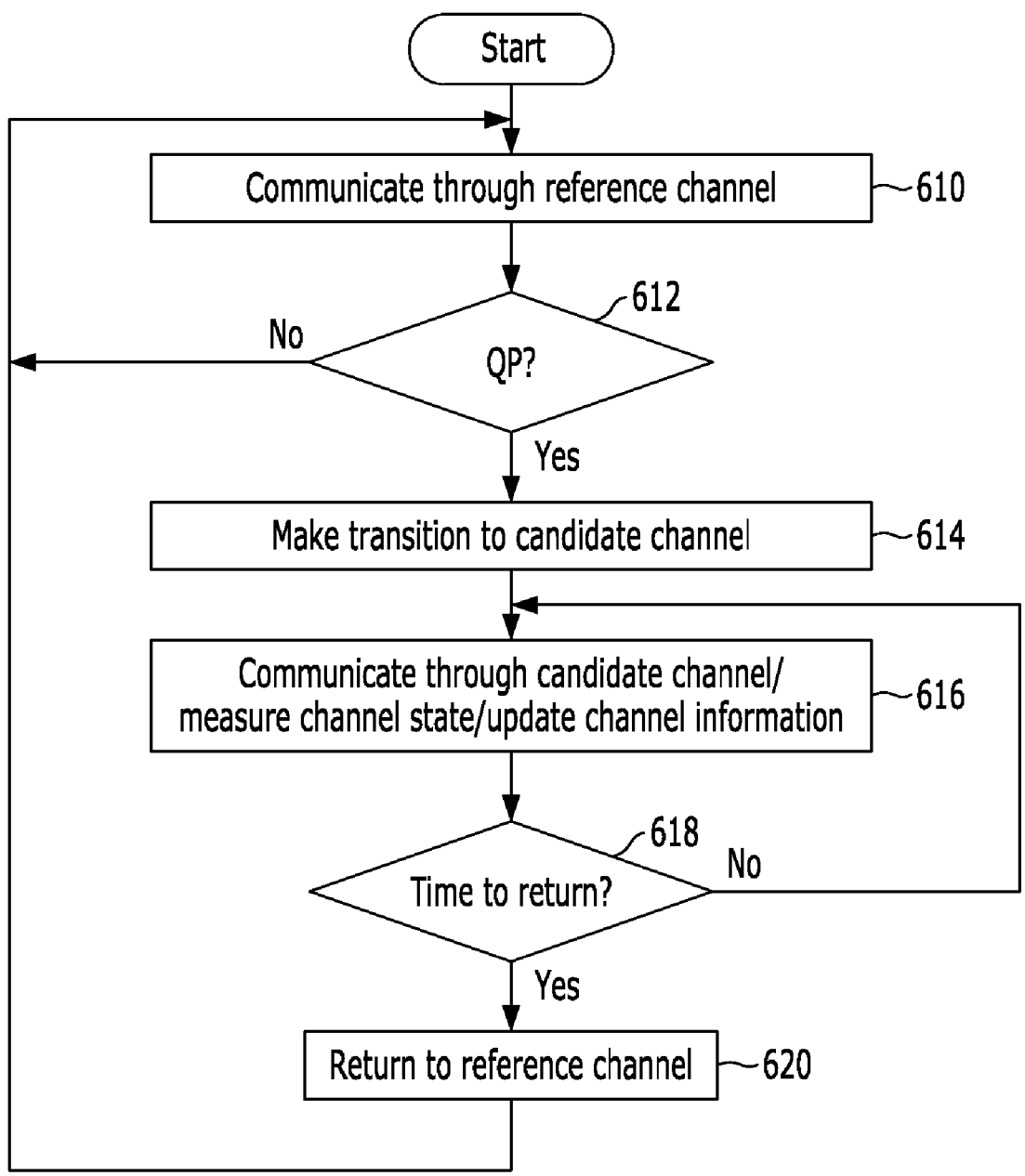
FIG. 8 is a flowchart illustrating the operation of a CR device shown in FIG. 1.

FIG. 8 is a flowchart illustrating the operation of a CR device shown in FIG. 1. It is to be noted that any situation in which new appearance of an IU device requires a channel transition is excluded in connection with the following description with reference to FIG. 8 and, although a single CR device will be described as an example, every other CR device performs the same operation in its network.

Referring to FIG. 8, the CR device 120 performs communication through a reference channel at step S610. The communication performed by the CR device 120 at the step S610 will now be described briefly. The CR device 120 may communicate with the master device 110 of the network to which the CR device 120 belongs, communicate with another CR device in the network to which it belongs, communicate with a CR device in another network, or communicate with a master device in another network.

When the CR device 120 performs communication through the reference channel at the step S610, information broadcasted by the master device 110 must be received without fail. The broadcasted information may include information regarding a QP, a candidate channel into which a transition is to be made in the QP, etc., details of which have already been described, so further description thereof will be omitted herein.

The CR device 120, while performing communication through the reference channel, proceeds to step S612 and checks if a QP arrives. The QP is already known from information broadcasted from the master device 110. When it is confirmed at the step S612 that a QP has arrived, the CR device 120 proceeds to step S614 and, if not, continually performs the step S610.

After proceeding to step S614, the CR device 120 controls the communication unit 122 so as to make a transition from the reference channel to a candidate channel based on candidate channel information stored in the channel information management unit 121.

After the channel transition from the reference channel to the candidate channel, the CR device 120 resumes communication through the candidate channel according to a predetermined method at step S616. The CR device 120 also measures the channel state and provides the master device 110 with the measurement result at the step S616. Then, the CR device 110 can update channel information using information broadcasted by the master device 110. Among these operations, no specific operation is necessarily given priority. For example, data communication is performed and followed by channel measurement and report, and channel information is updated. Alternatively, channel measurement, report, and channel information update are followed by data communication. That is, the present invention does not specify the order of communication.

The channel measurement is as follows: When the master device 110 broadcasts information described with reference to FIG. 4 and/or FIG. 5 to the CR device 120, the CR device 120 estimates the SINR using the broadcasted information and reports the estimated information back to the master device 110. Through this process, the master device 110 can acquire information regarding candidate channels and determine transmission priority regarding candidate channels using the candidate channel information transmitted by CR devices.

The method of estimating channels using the SINR can be applied differently according to the device fabrication method. For example, assuming that OFDM signals are used between the master device 110 and the CR device 120, received signals undergo FFT, and the resulting signals are compared with reference signals on constellation points to estimate the SINR.

After performing the step S616, the CR device 120 checks if time to return to the return channel has arrived at step S618. When it is confirmed at the step S618 that time to return to the reference channel has arrived, the CR device 120 proceeds to step S620 and returns to the return channel. When the return time has not arrived, the CR device 120 continuously performs the step S616.

Figure 9:
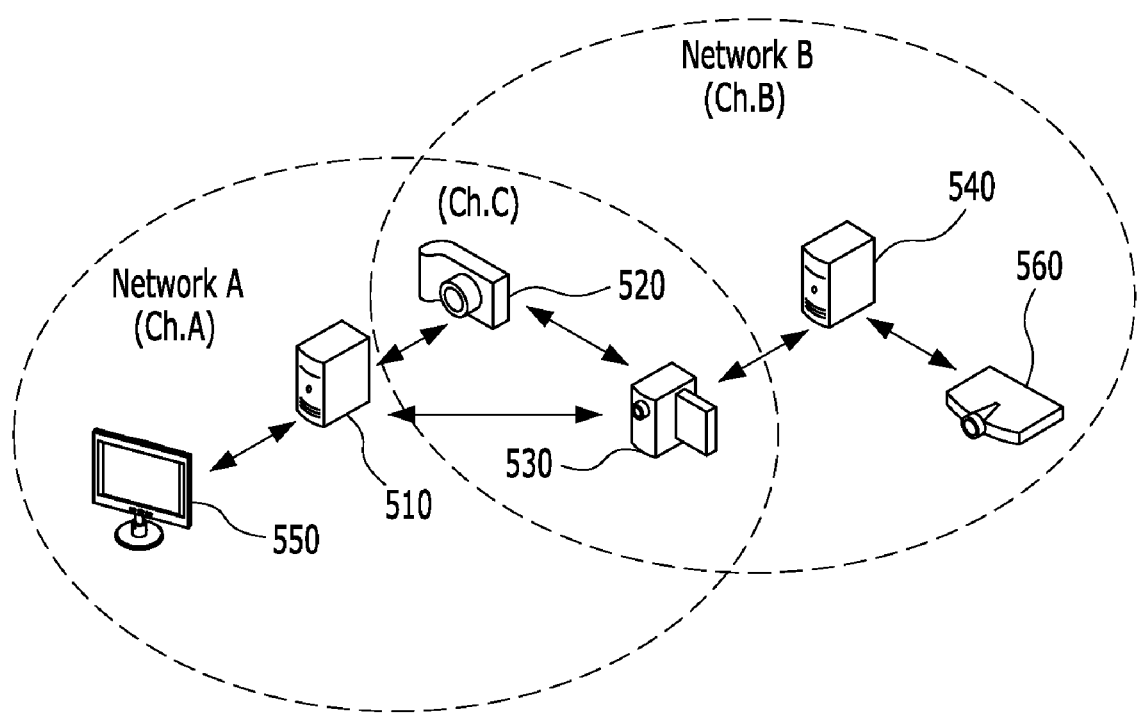
FIG. 9 illustrates channel information sharing between a plurality of CR networks in accordance with an embodiment of the present invention.

FIG. 9 illustrates channel information sharing between a plurality of CR networks in accordance with an embodiment of the present invention.

Referring to FIG. 9, the CR system includes two networks, specifically a first network 701 and a second network 702.

The first network 701 includes a first network management device 710, a first CR device 711, and a second CR device 712. The second network 702 includes a second network management device 750, a third CR device 751, and a fourth CR device 752.

It will be assumed that channel A is used in the first network 701, and channel B is used in the second network 702. Channel C can be used in the area where the first and second networks 701 and 702 overlap each other. Alternatively, channel A or channel B may be in the overlapping area.

The first network management device 710 communicates with the first and second CR devices 711 and 712 through channel A.

The second network management device 750 communicates with the third and fourth CR devices 751 and 752 through channel B.

The first network management device 710 can communicate with the fourth CR device 752 through channel C in a QP of channel A. In this case, the fourth CR device 752 receives channel information (or perform data communication) from the first network management device 710. The fourth CR device 752 can receive channel information (or data) regarding the second network. Therefore, in the QP of channel A, the fourth CR device 752 can transmit channel information (or data) to the second CR device 712 through channel C.

The second CR device 712 can communicate through the reference channel, i.e. channel A, and can receive channel information (or data) from the fourth CR device 752 through channel C in the QP of channel A.

The first and second network management devices 710 and 750 may be master devices. The fourth CR device 752, which transmits channel information to the second CR device 712, can be a master device with regard to the second CR device 752.

When there is a common candidate channel (channel C) in the candidate channel group of FIG. 9, each of two network signals can be simultaneously transmitted through the candidate channel (channel C) so that the CR devices can recognize the existence of other networks. Specifically, the CR devices can recognize the existence of other networks through the candidate channel (channel C) by means of sensing, for example.

When one of a plurality of networks allocates a QP at a predetermined interval, as in the case of FIG. 9, CR devices in other networks can receive channel information (or data) during the QP or receive channel information (or data) from equipment (network management device or CR device) of other networks. Though this process, channel information is exchanged between a plurality of networks.

A CR system in accordance with the present invention may include a single network using a plurality of channels or a plurality of networks having different channels.

In accordance with the exemplary embodiments of the present invention, channel information is provided through a candidate channel, into which a channel transition has been made, in a CR system so that CR devices can efficiently manage candidate channels. Furthermore, CR devices in the CR system make a channel transition from the reference channel to a candidate channel during a QP and then perform data communication, thereby improving data transmission performance.

While the present invention has been described with respect to the specific embodiments, it will be apparent to those skilled in the art that various changes and modifications may be made without departing from the spirit and scope of the invention as defined in the following claims.

What is claimed is:

1. A Cognitive Radio (CR) apparatus for performing communication in a CR network, comprising:
   a communication unit configured to measure a channel estimation signal, transmit measured channel state information to a master device, and, when a Quiet Period (QP) of a reference channel arrives, make a communication channel transition to a candidate channel and perform communication through the candidate channel; and
   a channel information management unit configured to receive and manage the channel state information measured by the communication unit and channel information comprising the candidate channel, into which a channel transition is to be made during the QP of the reference channel, received from the master device and control channel transition of the communication unit based on the channel information,
   wherein channel state of the candidate channel is measured by using a channel estimation signal transmitted through the candidate channel during the QP,
   wherein the candidate channel is selected to the communication channel transition for the QP based on the channel state of the candidate channel.

2. The CR apparatus of claim 1, wherein the channel information comprises at least one of channel estimation information, channel group management information, network information, and broadcasting information.

3. The CR apparatus of claim 2, wherein the channel estimation information comprises information for SINR measurement of the candidate channel.

4. The CR apparatus of claim 3, wherein the communication unit is configured to receive channel information and perform normal data communication during communication through the candidate channel.

5. The CR apparatus of claim 1, wherein the channel information management unit is configured to control the communication unit so as to make a channel transition from the candidate channel to the reference channel when the QP is over.

6. A master apparatus for performing communication in a Cognitive Radio (CR) network, comprising:
   a channel signal estimation unit configured to generate a channel estimation signal for estimation of a channel in the CR network;
   a communication unit configured to transmit the signal generated by the channel signal estimation unit and perform communication through a reference channel and a candidate channel;
   a channel information management unit configured to manage channel information regarding the reference channel and candidate channels, into which a channel transition is to be made in a Quiet Period (QP) of the reference channel, based on channel state information received from CR devices; and
   a channel allocation unit configured to allocate the reference channel or at least one of the candidate channels based on the channel information and control the communication unit,
   wherein channel state of the candidate channels is measured by using a channel estimation signal transmitted through the candidate channels during the QP in the CR devices,
   wherein the candidate channels is selected to the channel transition for the QP based on the channel state of the candidate channel in the CR devices.

7. The master apparatus of claim 6, wherein the channel information comprises at least one of channel estimation information, channel group management information, network information, and broadcasting information.

8. The master apparatus of claim 7, wherein the channel estimation information comprises information for SINR measurement of the candidate channel.

9. The master apparatus of claim 6, wherein the channel allocation unit is configured to set priority of candidate channel use for each CR device when allocating the candidate channel.

10. The master apparatus of claim 6, wherein the channel information management unit is configured to, when selecting the candidate channel, determine priority by considering channel transition time necessary for channel transition between the reference channel and the candidate channel.

11. A method for communication by a Cognitive Radio (CR) device in a CR network, comprising:
    making a channel transition from a reference channel to a candidate channel, when a starting point of a Quiet Period (QP) of the reference channel arrives during communication through the reference channel, in the QP;
    measuring a channel estimation signal transmitted through the candidate channel during the QP, and reporting measured channel state information to a master device; and
    receiving channel information comprising the candidate channel, into which a channel transition is to be made in the QP of the reference channel, through the candidate channel into which a transition has been made,
    wherein channel state of the candidate channel is measured by using the channel estimation signal,
    wherein the candidate channel is selected to the channel transition for the QP based on the channel state of the candidate channel.

12. The method of claim 11, wherein the channel information comprises at least one of channel estimation information, channel group management information, network information, and broadcasting information.

13. The method of claim 12, wherein the channel estimation information comprises information for SINR measurement of the candidate channel.

14. The method of claim 13, wherein the information for SINR measurement is used to select a candidate channel for the communication channel transition.

15. The method of claim 11, further comprising:
    making a transition from the candidate channel to the reference channel when the QP is over.

16. A method for communication by a master device in a Cognitive Radio (CR) network, comprising:
    allocating a reference channel and a candidate channel to a CR device based on channel information;
    making a transition to the predetermined candidate channel based on the channel information when a starting point of a Quiet Period (QP) arrives in the reference channel;
    generating a channel estimation signal in the candidate channel and transmitting the channel estimation signal; and
    receiving channel state information from the CR devices, generating channel information regarding the reference channel and candidate channels, into which a channel transition is to be made in the QP of the reference channel, based on the channel state information, and transmitting the channel information,
    wherein channel state of the candidate channels is measured by using the channel estimation signal transmitted through the candidate channels during the QP in the CR devices,
    wherein the candidate channels is selected to the channel transition for the QP based on the channel state of the candidate channel in the CR devices.

17. The method of claim 16, wherein the channel information comprises at least one of channel estimation information, channel group management information, network information, and broadcasting information.

18. The method of claim 17, wherein the channel estimation information comprises information for SINR measurement of the candidate channel.

19. The method of claim 16, wherein information regarding candidate channels of the channel information is allocated by setting priority of the candidate channels.

20. The method of claim 16, further comprising:
    performing data communication through the candidate channel.

* * * * *